United States Patent
Jung

(10) Patent No.: US 9,510,508 B2
(45) Date of Patent: Dec. 6, 2016

(54) MONITORING SYSTEM FOR CONTROLLING THE POSITION OF AN IMPLEMENT FOR AN AGRICULTURAL VEHICLE WHILE TAKING THE VEHICLE DYNAMICS INTO ACCOUNT

(71) Applicant: Deere & Company, Moline, IL (US)

(72) Inventor: Benedikt Jung, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/686,977

(22) Filed: Apr. 15, 2015

(65) Prior Publication Data
US 2015/0305239 A1    Oct. 29, 2015

(30) Foreign Application Priority Data
Apr. 29, 2014   (DE) .................. 10 2014 208 070

(51) Int. Cl.
*A01D 41/127* (2006.01)
*A01D 41/14* (2006.01)
*A01D 75/00* (2006.01)

(52) U.S. Cl.
CPC ................... *A01D 41/141* (2013.01)

(58) Field of Classification Search
CPC .................................................. A01D 41/141
See application file for complete search history.

(56) References Cited

U.S. PATENT DOCUMENTS

| 2004/0006958 A1* | 1/2004 | Thiemann | A01D 41/141 56/10.2 R |
| 2008/0177449 A1* | 7/2008 | Pickett | A01D 41/141 701/50 |
| 2011/0099962 A1* | 5/2011 | Coers | A01D 41/141 56/10.4 |
| 2013/0091819 A1* | 4/2013 | Deneault | A01D 41/141 56/10.2 E |
| 2015/0230403 A1* | 8/2015 | Jung | A01D 41/127 701/50 |

FOREIGN PATENT DOCUMENTS

| DE | 19900212 A1 | 8/2000 |
| DE | 20007795 U1 | 10/2001 |

(Continued)

OTHER PUBLICATIONS

European Search Report issued in counterpart application No. 15160060.8, dated Sep. 23, 2015 (6 pages).

*Primary Examiner* — Dale Moyer

(57) ABSTRACT

A control unit is connected to an actuator to adjust the position of the implement relative to the vehicle. A ground-profile determining device is connected to the control unit and is designed to determine a ground profile in front of the vehicle. The control unit is programmed to determine an expected vertical movement of the vehicle because of the ground profile and to prospectively transmit to the actuator a control signal that is dimensioned such that the implement is continuously guided in a predeterminable position above the ground profile. The control device considers the expected deformation of the ground profile because of the tires or tracks of the vehicle or an expected vertical movement of the vehicle relative to the ground profile.

15 Claims, 3 Drawing Sheets

(56) References Cited

FOREIGN PATENT DOCUMENTS

| | | |
|---|---|---|
| DE | 102010040872 A1 | 5/2011 |
| DE | 102014203005 B3 | 5/2015 |
| EP | 0331893 A2 | 9/1989 |
| EP | 1269823 A1 | 1/2003 |
| EP | 1356729 A1 | 10/2003 |
| EP | 2583545 A1 | 4/2013 |
| WO | 2006018215 A1 | 2/2006 |
| WO | 2008088916 A2 | 7/2008 |

* cited by examiner

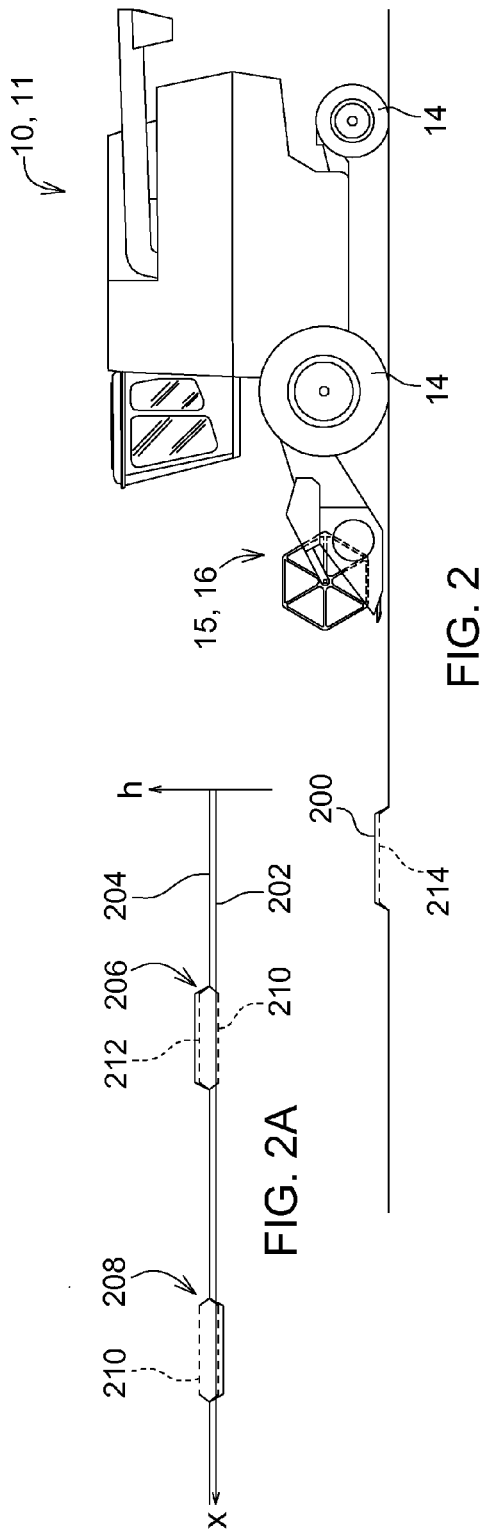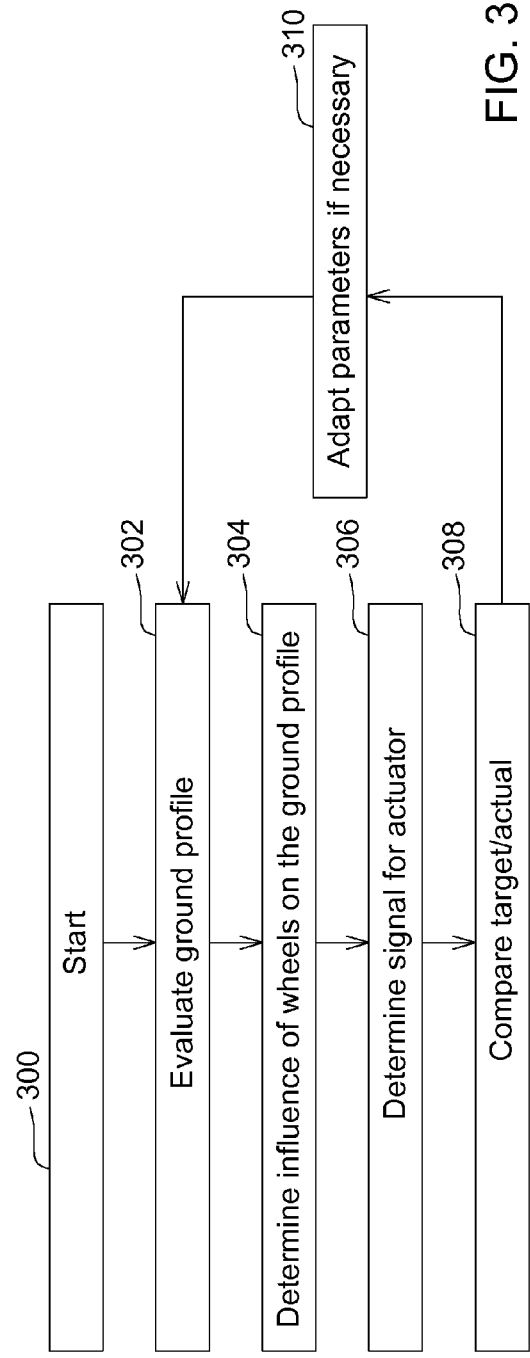

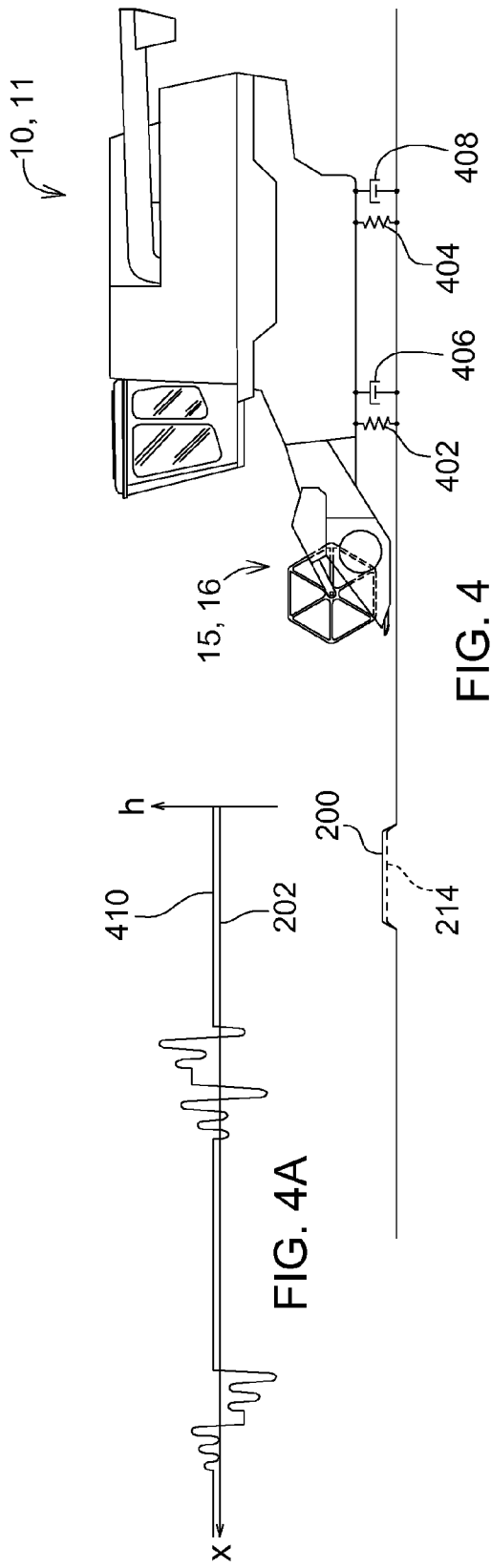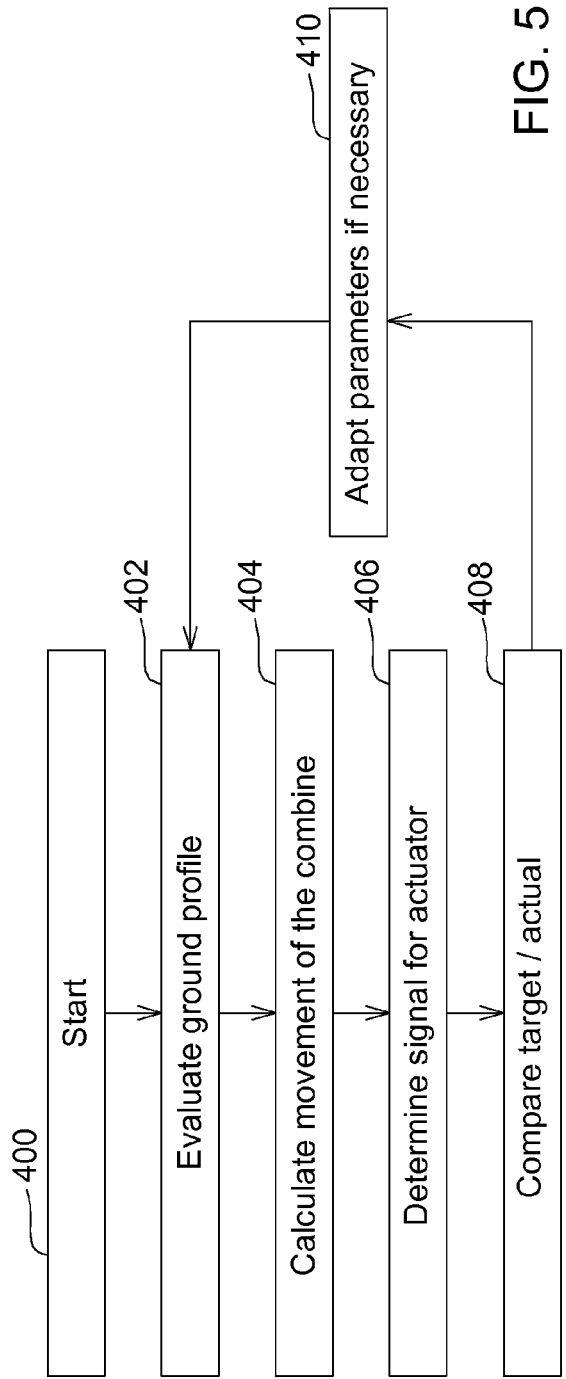

MONITORING SYSTEM FOR CONTROLLING THE POSITION OF AN IMPLEMENT FOR AN AGRICULTURAL VEHICLE WHILE TAKING THE VEHICLE DYNAMICS INTO ACCOUNT

RELATED APPLICATIONS

This document claims priority based on German Patent Application No. 102014208070.3, filed Apr. 29, 2014, which is hereby incorporated by reference into this document.

FIELD OF THE INVENTION

The invention relates to an arrangement for controlling the position of an implement mounted on an agricultural carrier vehicle that can move in a forward direction across a field by means that engage with the ground.

BACKGROUND ART

In many agricultural applications, implements are to be guided in a constant position above the ground of a field or above the plant grown thereon. Examples include harvester heads in front of harvesting machines, which must be guided at the most constant possible cutting height in order to cut off the plants at a defined height above the ground, or field sprayers, which must be guided across the field at the most constant possible height above the leaf canopy of the plant growth in order to apply sprayed material to the plants from a defined height. Maintaining a constant position relative to the transport vehicle, even when the harvesting machine travels over uneven ground, also makes sense for height-adjustable transfer devices with which crop is transferred from a harvesting machine to a transport vehicle, since the constant height can prevent loss of crop.

The position of the harvester head for harvesting machines is usually adjusted by actuators that pivot an intake housing of the harvesting machine along with the harvester head mounted on the front side thereof about a horizontal axis oriented transversely to the forward direction. For combines, this pivot axis typically coincides with an upper deflection roller of the intake conveyor in the intake housing, and for forage harvesters, it typically coincides with the axis of rotation of the chopper drum.

In the simplest case, the height of the harvester head above the ground is detected by sensors in the form of sensor bars or the like that are mounted below the harvester head. The output signals of the sensors are fed to a control unit that adjusts the actuator to adjust the position of the harvester heads for maintaining a desired cutting height (e.g., European Patent Application No. EP 0 331 893 A2), another actuator adjusting the harvester head relative to the harvesting machine about an axis oriented in the forward direction in order to align the harvester head parallel with the ground.

Such arrangements are subject to the disadvantage that the position of the harvester head also depends on the vertical position of the ground engagement means (tires or track drives) of the harvesting machine. If the front wheels drive over an obstacle (i.e. a bump on the ground) the harvester head is necessarily moved upward, and if the rear wheels drive over the obstacle, the harvester head is necessarily lowered. The monitoring arrangement for adjusting the position of the harvester head cannot respond directly to the movement of the harvesting machine, however, but learns of this only from the sensor values for the harvester head. Due to the response time of the actuators, a prompt response is not always possible in all cases, however, which can cause the harvester head to penetrate into the ground in some circumstances, with the result that dirt is picked up along with the crop, or even that the harvester head is damaged. A manual override by the operator in such cases is provided in the prior art according to European Patent Application No. EP 0 331 893 A2.

It was additionally proposed to detect the ground profile in front of the harvesting machine prospectively with a non-contact sensor using laser beams (e.g., European Patent Application No. EP 1 269 823 A1) or to connect a non-contact sensor or a sensor with ground contact to the harvester head (e.g., European Patent Application No. EP 1 356 729 A1 and German Patent Application No. DE 10 2010 040 872 A1) and to use the output signal thereof for timely enough activation of the actuator that vertical movements of the harvesting machine caused by unevenness of ground can be compensated by the monitoring arrangement. Such an arrangement can also be based on a stored topographical map of the field, which is queried location-specifically when harvesting (e.g., International Publication No. WO 2008/088916 A2).

When driving the actuator, however, the prospective monitoring arrangements mentioned in the preceding paragraph do not take account of the fact that the system consisting of ground, tires and harvesting machine is not incompressible in all cases. In other words, the monitoring arrangements assume that the uneven ground is not deformed (i.e. is incompressible), that the tires do not deform and that there is no suspension between the ground engagement means and the harvesting machine, so that there is no vertical relative motion between the ground profile and the harvesting machine. In reality, these assumptions are not accurate, however, because the shape of the uneven ground, at least that of loose sandy soil, will change (to some extent reversibly and to some extent irreversibly) when driven over by a combine with a full grain tank, which can hold 10,000 liters. The tires of a harvesting machine are also not incompressible, but instead deform when moving over ground deformations. Furthermore, machines are sometimes equipped with hydro-pneumatically suspended front wheels (e.g., German Patent Application No. DE 199 00 212 A1), hydro-pneumatically suspended track drives (e.g., International Publication No. WO 2006/018215 A1) or sprung rear wheels (e.g., German Patent No. DE 200 07 795 U1), which cannot be considered rigid systems per se. When driving over uneven ground, movements (particularly vibrations) thus arise in the tires and/or suspensions that are also transmitted via the harvesting machine and the intake housing to the harvester head and cannot be taken into consideration by conventional monitoring arrangements for positioning the harvester.

European Patent No. EP 2 583 545 A1 proposes to detect the deformation of the tire with a sensor. This deformation is used to calculate a compensation signal, on the basis of which the height at which the harvester head would be situated if the tire were no longer deformed is calculated. Based on this signal, the height of the harvester head is adjusted by the actuator in such a manner that the desired height above the ground is achieved. This therefore does not compensate for the vibration arising when traveling over uneven ground, but instead compensates for the fact that the varying position of the harvesting machine relative to the ground due to the deformation of the tire was not previously taken into consideration because the cutter height measurement was solely based on the sensor for determining the height of the cutter above the ground. A compensation of the vibration in the tire when driving over uneven ground is not possible with the above prior art arrangement.

SUMMARY

An arrangement and method for controlling a position of an implement mounted on an agricultural vehicle comprises a control unit that is connected in a signal-transmitting manner to an actuator arranged for adjusting the position of the implement relative to the vehicle. A ground-profile determining device is connected to the control unit and is designed to determine a ground profile in front of the vehicle. The control unit is programmed to determine an expected vertical movement of the vehicle because of the ground profile and to prospectively transmit to the actuator a control signal that is dimensioned such that the implement is continuously guided in a predeterminable position above the ground profile. When determining the expected vertical movement of the vehicle because of the ground profile, the control device is programmed to take into account an expected deformation of the ground profile because of the tires or tracks of the vehicle or an expected vertical movement of the vehicle relative to the ground profile because of movement induced in the tires or a suspension of the vehicle by the ground profile.

BRIEF DESCRIPTION OF THE DRAWINGS

FIG. 2 shows the combine when driving over a yielding uneven spot on the ground and the resulting height of the harvester head.

FIG. 2*a* shows the movements of the harvester head arising in the situation of FIG. 2.

FIG. 3 shows a flow chart according to which the combine of FIG. 2 operates.

FIG. 4 shows the combine when driving over an uneven spot in the ground causing an oscillation of the combine's tires and the resulting height of the harvester head.

FIG. 4*a* shows the movements of the harvester head arising in the situation of FIG. 2.

FIG. 5 shows a flow chart according to which the combine of FIG. 4 operates.

DETAILED DESCRIPTION OF ILLUSTRATIVE EMBODIMENT(S)

Figure 1:
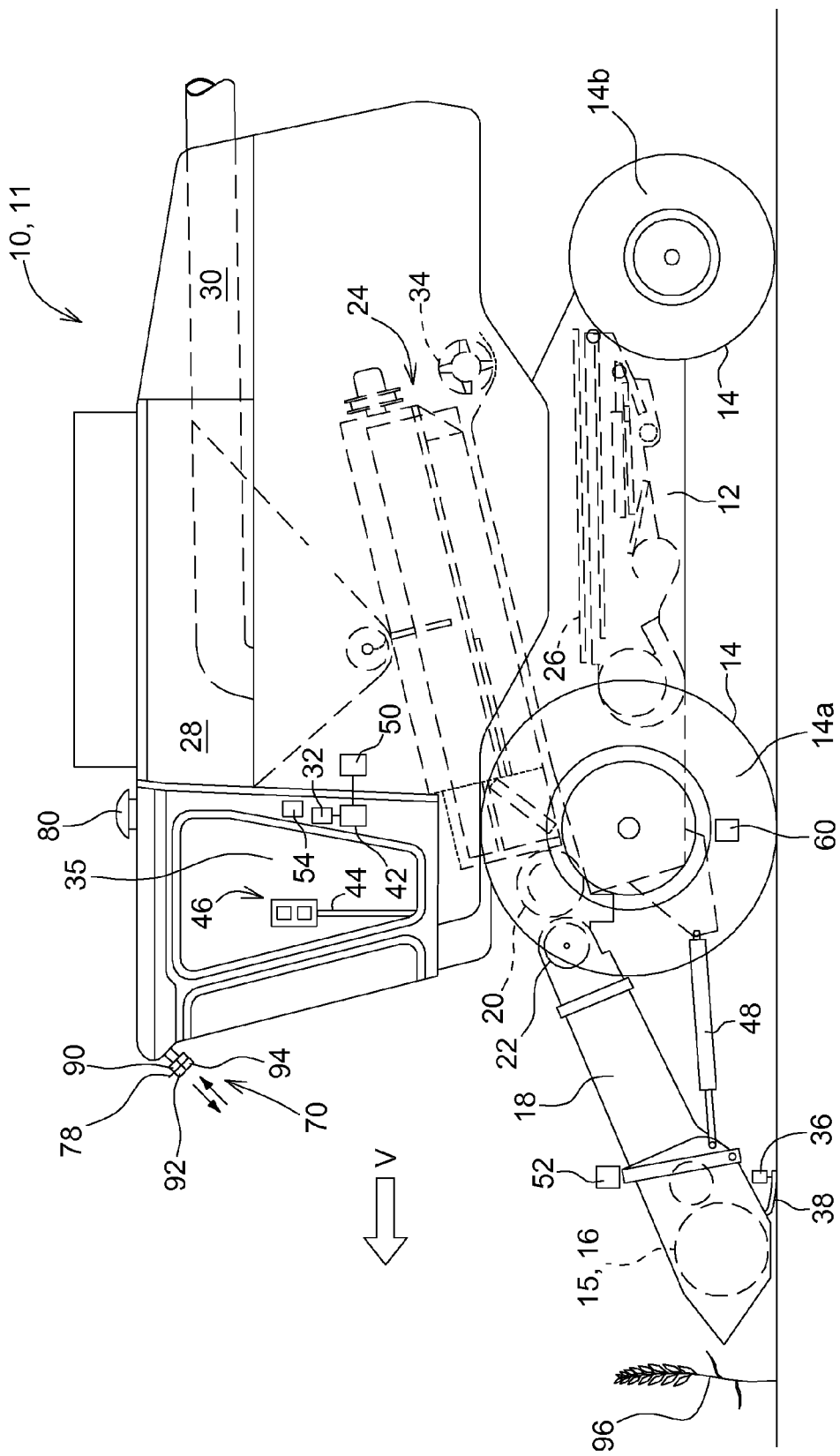
FIG. 1 shows a semi-schematic view of an agricultural combine.

The present disclosure is well suited for controlling the position of other implements mounted on the carrier vehicle or agricultural vehicle.

An arrangement for controlling the position of an implement mounted on an agricultural carrier vehicle that can move in a forward direction across a field by means that engage with the ground comprises a control unit that is connected in a signal-transmitting manner to an actuator arranged for adjusting the position of the implement relative to the carrier vehicle, and a ground profile determining device, which is connected to the control unit and is designed to determine a ground profile in front of the carrier vehicle. In particular, the actuator can control the height of the implement above the ground profile and/or the inclination of the implement relative to a horizontal pendulum axis extending in the forward direction. The control unit is programmed to determine an expected vertical movement of the carrier vehicle due to the ground profile and to prospectively transmit to the actuator a control signal that is dimensioned such that the implement is continuously guided in a predeterminable position above the ground profile. The control device is programmed to take into account, when determining the expected vertical movement of the carrier vehicle due to the ground profile, an expected deformation of the ground profile due to the ground engagement means and/or an expected vertical movement of the carrier vehicle relative to the ground profile due to movement induced in the tires and/or a suspension of the carrier vehicle by the ground profile and/or by a speed change of the carrier vehicle.

In other words, the control device calculates how the ground profile will deform when the carrier vehicle drives over an uneven part of the ground. As a rule, the soil of a field does not consist of extremely hard material (such as granite or stone) but is instead more or less yielding, depending on the nature of the soil and the moisture thereof, among other factors. The extent to which unevenness of the ground will affect the vertical position of the carrier vehicle also depends on the shape of the ground profile. Shorter bumps are more likely than long bumps to be rolled down by the ground engagement means of the carrier vehicle. The control unit accordingly calculates prospectively the extent to which the shape of the ground profile will actually change and controls the actuator for adjusting the position of the implement according to the result of this calculation as a continuous guiding of the implement at a height above the ground that can be predetermined (particularly by a user input or an autonomous specification).

Alternatively or additionally, the control device takes into account the manner in which the ground profile will affect the relative position between the ground profile and the carrier vehicle. As described above, the tires are not completely rigid, but instead yield flexibly under stress. This also applies to any suspension that may exist between the ground engagement means, which can be wheels with rubber tires or rubber track drives, and the carrier vehicle. Accordingly, a relative movement of the carrier vehicle relative to the ground profile arises when driving over an uneven spot in the ground. This relative movement is evaluated prospectively by the control device and taken into account in triggering the actuator which, as mentioned in the previous paragraph, is monitored to continuously guide the device at a predeterminable height above the ground. A change in speed of the carrier vehicle also leads to a nodding movement, which is calculated prospectively by the control device.

In this manner, vertical movements of the carrier vehicle arising when driving over uneven spots in the ground are automatically compensated to an improved extent, which enables a more constant maintenance of a desired height of the implement above the ground profile. The relative movement between the ground profile and the carrier vehicle can be a simple damped yielding of the tires or suspension (i.e. without oscillation induced thereby) or can be an oscillation arising while driving over an uneven spot in the ground. In the second case, the control device applies a control signal in opposite phase to the oscillation, which leads to the cancellation or at least attenuation of this oscillation. While the carrier vehicle thus undergoes the vertical oscillation, the implement is set into (oscillating) motion relative to the carrier vehicle in the opposite direction and amplitude, which causes the implement to remain in a constant position relative to the ground profile.

The control unit can use a model of the ground for determining the control signal. The manner in which the ground profile, and in particular any unevenness of the ground, will affect the movement of the carrier vehicle is calculated on the basis of known mechanical parameters of the carrier vehicle, the ground engagement means and the soil. The aforementioned mechanical parameters can be factory-programmed, or insofar as they are variable, can be input by an operator into the control device, or can be detected by suitable on-board or stationary sensors connected to the control unit by a transmission device, or can be derived (i.e. learned) from the actual behavior of the vehicle when traveling over the ground profile, as described below.

Analogously, a model that represents the dynamic behavior of the carrier vehicle when traveling on uneven ground can be used by the control unit to determine the relationship between the ground profile and the relative position between the ground profile and the carrier vehicle. The model can represent the behavior of the tires and suspension, which can be viewed as a spring with parallel-connected damping elements. A load state of the carrier vehicle, particularly with crop material, that is calculated or detected by sensors can also enter into the model. Since inputting all parameters of the model correctly into the control unit a priori is problematic, it is proposed that the control unit be connected to an actual value sensor for detecting the height of the implement above the ground. The control device can then adapt the model in a self-learning manner to the respective conditions on the basis of the signals from the actual value sensor.

The control unit can additionally be connected to a sensor for detecting the vertical movement and/or acceleration of the carrier vehicle and can take the signal of the sensor into account in determining the control signal. The values of the sensor can be used in particular for determining the vertical movement of the carrier vehicle actually achieved when driving over the ground profile, which in turn permits inferences of the change of the ground profile while being driven over and/or the oscillations or nodding movement arising in the carrier vehicle.

A speed signal and/or a speed change signal can also be supplied to the control unit. The control unit can take the speed signal or the speed change signal into account when determining the control signal. The speed signal and/or the speed change signal can be used first to determine the exact point in time at which the carrier vehicle reaches a defined point of the ground profile, and second to calculate the effect of the shape of the ground profile on the vertical position of the carrier vehicle. Thus the amplitude of an oscillation arising when traveling over an elevation will depend on the speed. The speed change signal can also be used to calculate a nodding movement of the carrier vehicle, which is in turn taken into consideration for driving the actuator.

The ground profile determining device can comprise, in a known manner, a ground sensor (compare with European Patent Application No. EP 1 269 823 A1, European Patent Application No. EP 1 356 729 A1 and German Patent Application No. DE 10 2010 040 872 A1) operating without contact or mechanically interacting with the ground, and/or can comprise a topographical map (see International Publication No. WO 2008/088916 A2).

The carrier vehicle can be a harvesting machine (e.g. combine, forage harvester, cotton picker, self-propelled or carried mower, or a sugarcane harvester), the implement of which is a harvester head or a transfer device for crop material. The carrier vehicle can also be a tractor, however, with an implement in the form of an attached harvesting machine or a field sprayer, or can be a self-propelled field sprayer. The spraying rod of a field sprayer can be guided at a desired height above the ground profile or above a leaf canopy of the plant growth.

Carrier Vehicle

FIG. 1 shows a self-propelled agricultural combine 10 serving as an example of a carrier vehicle 11, having a supporting structure 12 that is engaged with wheels 14 situated on the ground. Although the combine 10 is shown with wheels, it could also be furnished with two or four track drives. An implement 15, in the form of a cutter 16 in the present case, is used for harvesting crop and guides it to an inclined conveyor housing 18. The inclined conveyor 18 contains a conveying device for feeding the harvested crop to a guide drum 20. The guide drum 20 leads the crop to a rotatable crop processing device 24 designed for threshing and separating. The crop processing device 24 is arranged axially in the combine. While the crop processing device 24 in this case is implemented as an axial threshing and separating rotor, it is also possible to use a conventional transversely-arranged threshing drum that interacts with a threshing basket, which is followed by a straw shaker as the separating device, or at least one tangential or axial separating rotor.

The crop processing device 24 threshes and separates the harvested crop. The grain and the chaff fall through gratings on the bottom of the crop processing device 24 into a cleaning system 26. The cleaning system 26 removes the chaff and feeds the clean grain via an elevator (not shown) for clean grain. The elevator for clean grain deposits the grain in a grain tank 28. The clean grain in the grain tank 28 can be discharged by a discharge screw conveyor 30 onto a truck or a trailer.

Threshed straw free of grain is fed by the crop processing device 24 through an outlet 32 to an ejection drum 34. The ejection drum 34 ejects the straw at the rear end of the combine 10. It should be noted that the ejection drum 34 could also feed the crop freed of grain directly to a straw chopper. The operation of the combine 10 is controlled from an operator cab 35.

The height of the harvester head 16 in relation to the supporting structure 12 of the combine 10 is controlled by an actuator 48 in the form of a hydraulic cylinder that is arranged between the front side of the supporting structure 12 and the inclined conveyor 18, which is in turn articulated on the supporting structure 12 so as to be pivotable about the axis of rotation of the upper inclined conveyor roller 22. The actuator 48 pivots the inclined conveyor 18 together with the harvester head 16, and the height of the combination above the ground in the field when harvesting plant growth 96 there is controlled. An (optional) additional actuator 52 can pivot the harvester head 16 relative to the inclined conveyor 18 about a horizontal pendulum axis extending in the forward direction V.

Position Control of the Implement

The actuator 48 is driven by a control unit 42 that is coupled by an electrohydraulic valve unit 32 to the actuator 48. The target value for the height of the harvester head 16 above the ground can be input via a user interface 46, which can be arranged in particular on a drive lever 44 that is used for manually specifying the propulsion speed of the combine 10.

The actual height of the harvester head 16 above the ground in a given case is detected by means of an actual value sensor 36 connected by signal transmission means to the control unit 42 and cooperates with a sensing bar 38 dragging on the ground, which is pivotable about an axis extending transversely to the forward direction V. In particular, a plurality of actual value sensors 36 are distributed across the width of the harvester head 16, all of which are connected separately to the control unit 42.

In order to determine the ground profile in front of the combine 16, i.e. the vertical position of the surface of the field as a function of the lateral position and of the position in the forward direction (corresponding to the three dimensional topology of the field in front of the combine 16), the control device 42 is connected to a memory 50, in which this topology has been stored in advance. It may have been determined in a previous measuring run or a previous harvesting process. The current position of the combine 16 is determined by means of a position determining system 80, which receives signals from satellites (GPS, Galileo or Glonass) that emit position signals and, if applicable, from local correction signals. On the basis of the map from the memory 50 and the position determined by the position determining system 80, the control unit 42 thus evaluates the shape of the three-dimensional ground profile in front of the combine 10.

Alternatively or additionally, the ground profile can also be detected by means of a noncontact ground sensor 70, which has an electromagnetic radiation transmitter 92 (particularly radar) that penetrates the plant growth 96 but is reflected by the ground, a receiver 94 that detects the transit time of the waves, and an evaluation unit 90. The ground sensor 70 as a whole (or only the transmitter 92 and the receiver 94) are continuously pivoted by an adjusting drive about an axis 78 in order to scan in front of the combine 10 at least over the cutting width of the harvester head 16, or a fixed, i.e. not pivotable, sensor 70 is used, having a field of view sufficient to cover the width of the cutter 16 or at least of the wheels 14. The distance signals from the receiver 94 are calculated by the evaluation unit 90 into the three-dimensional ground profile and supplied to the control unit 42.

The ground profile can also be determined by actual value sensors 36 distributed across the width of the harvester head 16, wherein the position of the combine 10 can be detected by a wheel sensor 60 detecting the angle of rotation of the front wheels 14 and coupled to the control device 42 and/or by the position-determining system 80, and can be calculated to yield the position of the actual value sensors 36. In this regard, the signal of a sensor 54, implemented in particular as an inertial sensor, for detecting the vertical movement and/or acceleration of the combine 10 can also be taken into consideration, in order to consider the inaccuracies resulting from an instantaneously occurring vertical movement of the combine 10. The topology in the area of the ground to be driven over in the future by the wheels 14 can thus be measured in real time with the sensing bar 38 (or some other sensor interacting with the ground; compare to German Application No. DE 10 2010 040 872 A1) and stored until the front and rear wheels 14a, 14b have driven over the area, i.e. in real time. The true ground profile prior to the deformation results from the compensation of the position of the combine 10 by means of the sensor 54. A position-determining system 80 is not necessary in this case.

The control device 42 is programmed to drive the actuator 48 via the valve unit 32 in such a manner that the harvester head 16 is guided at a height above the ground that can be preset by the user interface 46. If the ground in the lateral direction (perpendicular to the drawing plane of FIG. 1) is not quite flat, the height and optionally the lateral inclination is selected (by the additional actuator 52) such that the height across the entire width does not fall below a predetermined value, but is also not exceeded more than necessary.

The actuator 48 and optionally 52 is driven in a prospective manner depending on the ground profile in front of the combine 10. Accordingly, if the harvester head 16 approaches an elevation in the ground profile, the harvester head 16 is raised at the proper time in a manner that takes into account the reaction times and the achievable adjustment speeds of the valve unit 32 and the actuator 48 and optionally 52. The fact that the ground profile influences the vertical position of the ground engagement means (in this case: wheels 14), which in turn has an effect on the position of the harvester head 16, is also taken into account. Before the front wheels 14 pass through a depression, the harvester head 16 is accordingly likewise lifted prospectively. In this regard, the reader is referred to the prior art according to European Patent Application No. EP 1 269 823 A1, European Patent Application No. EP 1 356 729 A1, German Patent Application No. DE 10 2010 040 872 A1 and International Publication No. WO 2008/088916 A2, which are hereby incorporated by reference into the present document.

Taking into Account the Change of the Ground Profile when Driven Over

The reader is now referred to FIG. 2, in which the combine 10 of FIG. 1 is shown during the harvesting process on a field. The ground profile of the field has an elevation 200 that extends across the width driven over by the wheels 14. The combine would raise the harvester head 16 at the proper time before it reaches the elevation 200 and again lower it when it has passed the elevation 200. FIG. 2a shows the temporally subsequent progression of the height of the harvester head 16: the line 200 represents a height of 0 and the solid line 204 represents the height of the harvester head 16 above the ground if the control unit 42 were not to take account of the progression of the ground profile. Then the harvester head 16 would be raised at point 206 from its previous specified height because the front wheels 14 reach the elevation 200 precisely at that point, and will again be lowered as soon as the front wheels 14 have reached the lower general ground level after driving over the elevation 200. Analogously, the harvester head 16 would be lowered from its previous specified height at point 208, because the rear wheels 14 reached the elevation 200 precisely at that point, and as soon as the rear wheels 14 have again reached the lower general ground level after driving over the elevation 200, the harvester head would move up to the previous height. At point 208, the harvester head 16 would penetrate into the ground and carry soil material with the crop and could also be damaged.

FIG. 2a also shows a dashed curve 210, which would be used by a known control unit 42 (see the prior art mentioned in the previous paragraph). At point 206, the harvester head 16 would be lowered so that (despite the lifting by the front wheels 14 when driving over the elevation 200) it remains in its desired height, and at point 208 it would be raised so that (despite the lowering due to the rear wheels 14 when driving over the elevation 200) it does not penetrate into the earth, but rather remains the desired height above the ground. This curve 210 assumes, however, that the ground in the region of the elevation 200 is completely rigid, i.e.

does not yield to any extent, and neither deforms plastically nor elastically when the wheels 14 of the combine 10 drive over it.

This assumption is not correct in all cases, however. The control device 42 in the present embodiment therefore uses a dotted curve 212 that assumes that the elevation 200 yields elastically and/or plastically (to a greater extent than the remaining ground) when it is driven over by the wheels 14, as shown by the curve 214 in FIG. 2. In order to take this fact into account, the harvester head 14 is raised and lowered according to curve 212 of FIG. 2a, but to a lesser extent than the curve 210.

The control device 42 proceeds according to the flow chart in FIG. 3. After the start in step 300, the three-dimensional ground profile in front of the combine 10 is evaluated in step 302 in the manner described above. The influence that the wheels 14 have on the ground profile, i.e. the extent to which the wheels 14 roll down an elevation 200, is then determined in step 304. Among other things, the fill level of the grain tank 28, determined by sensors and/or by means of a yield chart, and the density of the crop material are taken into account in step 304, because the mass of the crop material in the grain tank 28 has a large influence on the extent to which the wheels 14 influence the ground profile. Other ground parameters such as soil moisture and soil type, or a compressibility derived therefrom, and tire parameters such as pressure in the tires 14a, 14b (which can be detected by suitable pressure sensors), dimensions, etc., are taken into account in step 304. The current speed of the combine 10 (determined by means of the position-determining device 80 or some other speed sensor) is also taken into account because it has an influence on the extent to which the ground profile is influenced by the wheels 14. Accordingly, a modified ground profile that corresponds to the curve 214 in FIG. 2 is calculated in step 304 and the deformation by the wheels 14 (or the rubber track drives) is taken into account.

Then follows step 306, in which (likewise taking into account the current speed of the combine 10 in order to ensure that the drive signal matches the position of the combine) a triggering signal depending on the modified ground profile from step 304 is calculated for the actuator 48 and/or 52. The actuators 48 and/or 52 are subsequently triggered according to the results of step 306. When traveling over the ground profile, the actual value for the height of the harvester head 16 above the ground, determined on the basis of the actual value sensors 36, is then compared in step 308 to the desired progression of the height of the harvester head (i.e. the height inputs by the operator via the user interface 46). Alternatively or additionally, the signal of a sensor 54, implemented in particular as an inertia sensor, for detecting the vertical movement and/or acceleration of the combine 10 can be used in step 308 in order to determine the extent to which the combine 10 is actually raised when traveling over the elevation 200.

If the actual value has deviated from the target value, the parameters used in step 304 are modified in a subsequent step 310 with the objective of achieving the target value in the future. For example, if it is determined in step 308 that the wheels 14 are penetrating farther into the ground than was calculated, a lower strength of the ground is used as the basis in the next step 304. The control device 42 can use respectively constant parameters for steps 304 and 310, or can use the map in which different parameters are used for different regions of the field. This map can be based on an existing map of soil type and/or soil moisture, for example.

Taking into Account the Oscillation Arising in the Tires

FIG. 4 again shows the combine 10 on a field before driving over an elevation 200. To clarify the point that in practice the tires 14a, 14b of the wheels 14 are not rigid but instead have an attenuated resilience, the wheels 14 here have been replaced by springs 402, 404 and damping elements 406, 408. The suspension of the tires 14a, 14b of the combine 10 causes the vertical structure 12 (i.e., the actual combine 10 other than the wheels 14) to begin to oscillate vertically when the combine 10 drives over the elevation 200. This phenomenon can be observed for any sprung vehicle that drives over such an elevation (e.g. cars driving over bumps). Previous height controllers for harvester heads 16 have not taken this relative movement between the ground profile and the combine 10 into account. In addition to the tires 14a, 14b, other suspensions for the front and/or rear wheels 14 of the combine 10 can also be present.

To avoid imprecision in the height guidance arising due to these vibrations, the controller 42 proceeds according to the flow chart in FIG. 5. After the start in step 400, the ground profile is evaluated in step 402. This may be the uncorrected ground profile of step 302 in FIG. 3 or the modified ground profile of step 304 in FIG. 3 (cf. curve 214 in FIG. 4). In a subsequent step 404, the movement of the combine 10 is calculated in accordance with the three-dimensional shape of the ground profile. A model for the combine 10 corresponding to FIG. 4 can be used, i.e. a model having spring constants for the front and rear wheels 14 and associated damping constants. The fill level of the grain tank 28 or the mass of the crop product contained therein enters into this model in the manner described above with reference to FIG. 3, as does the pressure in the tires, 14a, 14b, which can be detected by suitable sensors. The actual ground profile also enters into step 404 in order to take into account the movement of the combine 10 based only on the ground profile. The current speed of the combine 10 (determined by means of the position-determining device 80 or a different speed sensor) is also taken into consideration, since the amplitude of the resulting oscillation also depends on the speed with which the combine 10 drives over the elevation 200. The result of step 404 is the height of the harvester head 16 above the ground as a function of the path length x in the forward direction V that would be expected without a counteraction by the actuators 48 and optionally 52.

In a subsequent step 406, a trigger signal for the actuator 48 and/or 52 is then calculated (likewise taking into account the current speed of the combine 10 in order to ensure that the trigger signal matches the position of the combine), the signal being based on the result of step 404 and designed such that the desired position of the harvester head 16 that was input with the user interface 46 is maintained as well as possible. If the tires 14a, 14b of the wheels 14, and thus the combine 10, are set into an oscillating motion at an elevation, the actuators 48 and optionally 52 are triggered in opposite phase and with a suitable amplitude to compensate for the oscillation. This can be done proactively (e.g. by shaping; cf. DE 10 2014 203 005 A1) or reactively (sensor-assisted). In this regard, see curve 410 of FIG. 4, which cancels an oscillation arising in the tires 14a, 14b when driving over the elevation 200 and leads to a constant height of the harvester head 16 even when the combine 10 is traveling over the elevation 200. The actuators 48 and/or 52 are subsequently triggered according to the results of step 406.

When traveling over the ground profile, the actual value for the height of the harvester head 16 above the ground as determined on the basis of the actual value sensors 36 is then compared in step 408 to the desired progression of the height of the harvester head (i.e. the height input by the operator via the user interface 46). Alternatively or additionally, the signal of a sensor 54 for detecting the vertical movement and/or acceleration of the combine 10, implemented in particular as an inertia sensor, can be used in step 408 in order to determine the extent to which the combine 10 is set into oscillation when traveling over the elevation 200. If the actual value has deviated from the target value, the parameters used in step 404 are modified in a subsequent step 410 with the objective of achieving the target value in the future. If the frequency or damping of the actual oscillation deviates from the expected oscillation, the natural frequency or damping of the system consisting of spring 402 or 404 and damping member 406 or 408 used in step 404 is appropriately modified.

For the model of the combine 10 shown in FIG. 4, an estimation of the degree of deformation of the tires 14a, 14b could be as follows, using the example of a second-order delay element, and would also be valid for transmission functions of higher order.

For the modeled trajectory $Y_1$, taking into account the measured, non-deformed ground bump $U_{mess}$ (the elevation 200 in FIG. 4), the following transmission function can be assumed for the sake of example:

$$\frac{Y_1(s)}{U_{mess}(s)} = \frac{K}{T^2 s^2 + 2dTs + 1}$$

The parameters 1/T and d describe the natural frequency and the damping of the combine/harvester head combination. They depend on the system mass, the spring and damping properties of the tires 14a, 14b and the spring and damping properties of the ground. The actually measured trajectory $Y_2$ (curve 214 in FIG. 2) can be described by means of the same structure, wherein it can be assumed that spring and damping properties of the tires 14a, 14b and the ground have not changed.

$$\frac{Y_2(s)}{U_{real}(s)} = \frac{Y_2}{U_{mess}(S) \cdot D} = \frac{K}{T^2 s^2 + 2dTs + 1}$$

D represents the deformation degree in this case.

Rearranging the equation provides information on the current degree of deformation of the ground bump that can be directly taken into account in the next modeling of the system excitation, in order to achieve a better initial control of the harvester head 16.

The respective propulsion speed of the combine 10 is taken into account in steps 304, 306, 404 and 406. Instead of using the above-mentioned sensor signals for detecting the actual speed, it would be possible to use speeds based on specifications that reflect the position of the drive lever 44 or an automatic throughput-based speed controller. These specifications can look into the future better than measured speeds.

Such speed changes of the combine 10 also lead to nodding movements of the combine 10 (forward when braking and backward when accelerating) due to the elasticity of the tires 14a, 14b and possibly a suspension; and the nodding movements can be automatically taken into account by the control device 42 in steps 306 and 406.

It must also be remarked that driving of one of the actuators 48, 52 by the control device 42 in steps 306 and 406 can also lead to a nodding oscillation of the combine 10 due to the elasticity of the tires 14a, 14b and/or the suspension. The control unit 42 can also take these nodding vibrations into account in steps 306 and 406 in order to minimize their influence. It would also be conceivable to cancel or reduce the nodding oscillations by opposite-phase triggering of the actuators 48 and 52, as described in DE 10 2014 203 005 A1, the disclosure of which is hereby incorporated by reference into the present documents.

Having described on or more embodiments, it will become apparent that various modifications can be made without departing from the scope of the invention as defined in the accompanying claims. Further embodiments of the invention may include any combination of features from one or more dependent claims, and such features may be incorporated, collectively or separately, into any independent claim.

The invention claimed is:

1. An arrangement for controlling a position of an implement mounted on an agricultural vehicle that can move in a forward direction across a field by tires or tracks that engage with the ground, the arrangement comprising:
   a control unit that is connected in a signal-transmitting manner to an actuator arranged for adjusting the position of the implement relative to the vehicle;
   a ground profile determining device, which is connected to the control unit and is designed to determine or to store a ground profile in front of the vehicle in an area of the ground to be driven over by the vehicle in the future;
   where the control unit is programmed to determine an expected vertical movement of the vehicle due to the ground profile and to prospectively transmit to the actuator a control signal, consistent with a reaction time of the actuator, that is dimensioned such that the implement is continuously guided in a predeterminable position above the ground profile; and
   where the control device is programmed to take into account, when determining the expected vertical movement of the vehicle because of the ground profile, an expected deformation of the ground profile due to a ground engagement means and an expected vertical movement of the vehicle relative to the ground profile because of movement induced in the tires or a suspension of the vehicle by the ground profile; where the ground engagement means comprises tires or tracks.

2. The arrangement according to claim 1, wherein the expected vertical relative movement of the vehicle relative to the ground profile while traveling over an uneven spot of ground is an oscillation caused by tire deformation or spring travel between the ground engagement of the tires or tracks and the vehicle, and wherein the control device is programmed to apply a compensating control signal, in opposite phase to the oscillation, to the actuator.

3. The arrangement according to claim 1, wherein the control unit is programmed to use a model of the ground or the vehicle to determine the control signal, the model representing the dynamic behavior of the vehicle while traveling on uneven spots of ground.

4. The arrangement according to claim 3, wherein a load state of the vehicle that is detected by a sensor or calculated enters into the model.

5. The arrangement according to claim 3, wherein the control unit is connected to an actual value sensor for detecting a height of the implement above the ground and is programmed to adapt the model in a self-learning manner to the respective conditions, on the basis of the signals of the actual value sensor.

6. The arrangement according to claim 1 wherein the control unit is connected to a sensor for detecting the expected vertical movement or acceleration of the vehicle and is operated to take the signal of the sensor into account when determining the control signal.

7. The arrangement according to claim 1 wherein a speed signal or speed change signal is fed to the control unit, and the control unit is programmed to take the speed signal or speed change signal into account when determining the control signal.

8. The arrangement according to claim 1 wherein the ground profile determining device comprises a ground sensor or a topographical map stored in a memory, where the ground sensor operates without contact or mechanically interacting with the ground.

9. The arrangement according to claim 1 wherein the ground profile determining device comprises a memory for storing the ground profile as a topographical map.

10. The arrangement according to claim 9 further comprising:
a position determining device that provides a position of the vehicle to support reference to the stored topographical map.

11. The harvesting machine according to claim 1, wherein the expected vertical movement of the vehicle relative to the ground profile while traveling over an uneven spot of ground is an oscillation caused by tire deformation or spring travel between the ground engagement of the tires or tracks and the vehicle, and wherein the control device is programmed to apply a compensating control signal, in opposite phase to the oscillation, to the actuator.

12. A harvesting machine having an implement, particularly a harvester head, the harvesting machine comprising:
a control unit that is connected in a signal-transmitting manner to an actuator arranged for adjusting the position of the implement relative to the harvesting machine;
a ground profile determining device, which is connected to the control unit and is designed to determine or to store a ground profile in front of the harvesting machine in an area of the ground to be driven over by the harvesting machine in the future;
where the control unit is programmed to determine an expected vertical movement of the harvesting machine because of the ground profile and to prospectively transmit to the actuator a control signal, consistent with a reaction time of the actuator, that is dimensioned such that the implement is continuously guided in a predeterminable position above the ground profile; and
where the control device is programmed to take into account, when determining the expected vertical movement of the harvesting machine due to the ground profile, an expected deformation of the ground profile due to a ground engagement means and an expected vertical movement of the harvesting machine relative to the ground profile due to movement induced in the tires or a suspension of the harvesting machine by the ground profile.

13. The harvesting machine according to claim 12 wherein the ground profile determining device comprises a memory for storing the ground profile as a topographical map.

14. The harvesting machine according to claim 13 further comprising:
a position determining device that provides a position of the vehicle to support reference to the stored topographical map.

15. A method for controlling the position of an implement mounted on an agricultural vehicle that can move in a forward direction across a field by tires or tracks that engage with the ground, the method comprising:
by a control unit that is connected in a signal-transmitting manner to an actuator, adjusting a position of the implement relative to the vehicle; and
by a ground profile determining device, which is connected to the control unit, for determining or storing a ground profile in front of the vehicle;
by the control unit, determining an expected vertical movement of the vehicle because of the ground profile and prospectively transmitting to the actuator a control signal, consistent with a reaction time of the actuator, that is dimensioned such that the implement is continuously guided in a predeterminable position above the ground profile,
when determining the expected vertical movement of the vehicle because of the ground profile, taking into account an expected deformation of the ground profile because of a ground engagement means and an expected vertical movement of the vehicle relative to the ground profile due to movement induced in the tires or a suspension of the vehicle by the ground profile.

* * * * *